UNITED STATES PATENT OFFICE.

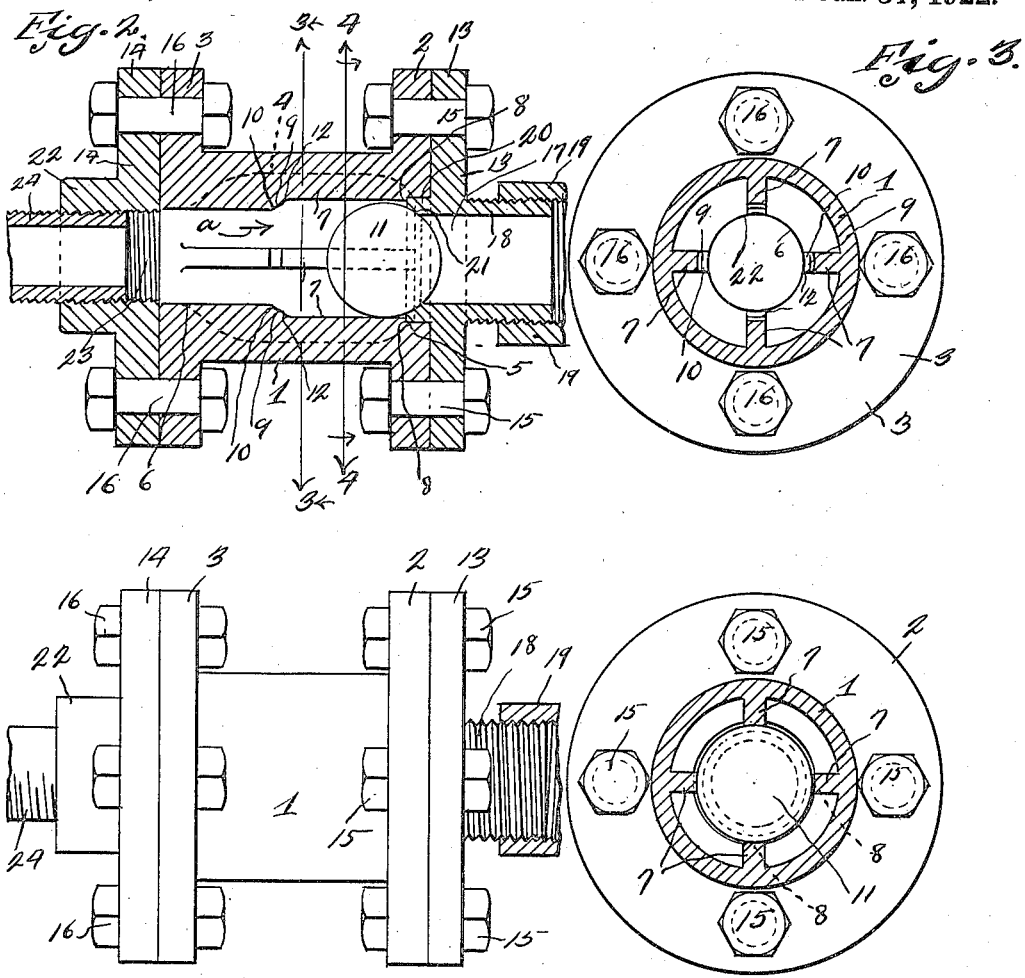

JERRY W. STEVENS, OF CLOQUET, MINNESOTA, ASSIGNOR OF THREE-EIGHTHS TO ALEX SUMMERFIELD, OF CLOQUET, MINNESOTA.

CHECK VALVE.

1,404,804.  Specification of Letters Patent.  Patented Jan. 31, 1922.

Application filed July 9, 1918. Serial No. 244,058.

*To all whom it may concern:*

Be it known that I, JERRY W. STEVENS, a citizen of the United States, residing at Cloquet, in the county of Carlton, State of Minnesota, have invented a new and useful Check Valve; and I do hereby declare the following to be a full, clear, and exact description of the invention, such as will enable others skilled in the art to which it appertains to make and use the same.

This invention relates to an improved check valve, and one of the objects of the invention is to provide a non-corrosive valve adapted for use in connection with pipe lines for conveying steam or liquid.

A further object of the invention is to provide a check valve which may be employed in a horizontal or perpendicular or inclined pipe line.

A further object of the invention is to provide a check valve which is simple, inexpensive and practical in construction, and which may be so made, substantially as illustrated, so as to be sold at a reasonable profit.

A further object of the invention is to provide a check valve having a removable seat, the part which carries the seat may be removed and reground as often as may be necessary, as the seat is that part which is subject to wear.

A further object of the invention is to provide a check valve casing, which may be connected between the adjacent ends of pipe line sections, so that the check valve casing may be easily removed, without disturbing or removing the pipe line sections.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation of the check valve, showing the same connected between the adjacent ends of a pair of pipe line sections.

Figure 2 is a longitudinal sectional view.

Figure 3 is a sectional view on line 3—3 of Figure 2.

Figure 4 is a sectional view on line 4—4 of Figure 2.

Referring more especially to the drawings 1 designates the valve casing, which may be any suitable shape preferably cylindrical, the ends of which are provided flanges 2 and 3. The interior of the valve casing has a cylindrical chamber 4, both ends of which merge into restricted portions or openings 5 and 6. However, the restricted portion or opening 5 is of greater diameter than the opening or restricted portion 6. The wall of the chamber 4 is provided with a plurality of diametrically opposed ribs 7. The distances between the opposing edges of these ribs are a little less than the diameter of the opening or cut-away portion 5, thereby providing shoulders 8. The distances between the opposing edges of the ribs 7 adjacent the opening 6 are equal to the diameter of the opening 6. By the differences between the distances between the opposing edges of the ribs of their opposite ends cause the formation of shoulders 9 centrally of the ribs. These shoulders 9 are provided with distinctly formed curved portions 10, to be engaged by the ball check valve 11 when it moves in one direction. However, the parts 12 of said shoulders are not engaged by the ball check valve, thereby avoiding binding between the valve and the edges of the ribs at points near the shoulder, whereby the valve may quickly and easily move out of contact with the curved bearings 10 instantly when pressure is exerted in the direction of the arrow *a* on the valve. Union coupling plates 13 and 14 are secured to the flanges 2 and 3 by means of the bolts 15 and 16. The union coupling plate 13 has a central opening 17, and provided with a threaded nipple 18, which is concentric with the opening 17 and may be threaded into a pipe line section 19. Also concentric with the opening 13 and integral with the plate 13 is an extension flange 20, which telescopically fits neatly or closely into the opening, the marginal edges of the flange 20 engaging the shoulders 8 of said ribs 7. This flange 20 has a valve seat 21 which is constructed concentrically with the ball valve. The union coupling plate 14 is provided with an extension nipple 22 which is concentric with the opening 23 of the plate and the opening 6 at one end of the valve casing. This nipple 22 may be interiorly or exteriorly threaded, so as to be connected as shown to an opposing pipe line section 24. It is to be observed that the valve casing may be easily removed, without disturbing either one of the pipe line sections, by simply removing the bolts 15 and 16, and backing either one or both of the union coupling plates in the direction of the pipe line section which will permit the valve casing to be removed from between said coupling plates. At the time of removing the valve casing, the union coupling plate 13 may be detached, and the valve seat reground. This may be accomplished as many times as may become necessary. When the ball check valve is in contact with the bearings 10, there is a free passage for the steam or liquid around the ball valve between the ribs, but the instant there is an exertion created to move the valve toward its seat, it depending whether it is pressure in the direction of the arrow $a$ or suction in the same direction from the opposite side of the valve or whether it is due to gravity, the ribs will act to guide the ball toward its seat.

The invention having been set forth what is claimed as new and useful is:—

A check valve comprising a cylindrical body member having outwardly extending flanges at its ends, longitudinally disposed spaced flanges within the cylindrical body member, shoulders carried by said longitudinally disposed flanges at a point spaced from one of their ends, a spherical check valve disposed on said flanges, the ends of said flanges terminating in shoulders, a flanged coupling member attached to each end of the cylindrical body member and to the flanges thereof, one of said flanged coupling members being provided with a projecting annular flange extending into the body member and engaging the last named shoulders of the flanges and forming a valve seat for limiting the spherical valve in its movement in one direction.

In testimony whereof I have signed my name to this specification in the presence of two subscribing witnesses.

JERRY W. STEVENS.

Witnesses:
WALTER L. CASE,
ALEX SUMMERFIELD.